(12) United States Patent
Hernandez, Jr. et al.

(10) Patent No.: US 7,096,596 B2
(45) Date of Patent: Aug. 29, 2006

(54) TAPE MEASURE DEVICE

(75) Inventors: Hector Ray Hernandez, Jr., Fullerton, CA (US); Jaime Nash, Rancho Santa Margarita, CA (US)

(73) Assignee: Alltrade Tools LLC, Long Beach, CA (US)

( * ) Notice: Subject to any disclaimer, the term of this patent is extended or adjusted under 35 U.S.C. 154(b) by 0 days.

(21) Appl. No.: 10/945,679

(22) Filed: Sep. 21, 2004

(65) Prior Publication Data
US 2006/0059703 A1   Mar. 23, 2006

(51) Int. Cl.
*G01B 3/10* (2006.01)
(52) U.S. Cl. .............................. 33/755; 33/757; 33/771
(58) Field of Classification Search ................ 33/755, 33/757, 771, 767; 72/176
See application file for complete search history.

(56) References Cited

U.S. PATENT DOCUMENTS

| | | | |
|---|---|---|---|
| 2,956,795 A * | 10/1960 | Foster | ........................ 267/156 |
| 3,060,881 A * | 10/1962 | Gahlinger | .................... 72/176 |
| 4,411,072 A | 10/1983 | Rutty et al. | |
| 4,429,462 A | 2/1984 | Rutty et al. | |
| 6,243,964 B1 | 6/2001 | Murray | |
| 6,324,769 B1 * | 12/2001 | Murray | ........................ 33/755 |
| 6,367,161 B1 * | 4/2002 | Murray et al. | ................. 33/757 |
| 6,643,947 B1 | 11/2003 | Murray | |
| 6,662,463 B1 * | 12/2003 | Lee | .............................. 33/757 |
| 2002/0029489 A1 | 3/2002 | Murray | |
| 2002/0078585 A1 | 6/2002 | Murray | |

FOREIGN PATENT DOCUMENTS

JP    55122827 A  *  9/1980

* cited by examiner

*Primary Examiner*—Christopher W. Fulton
(74) *Attorney, Agent, or Firm*—John J. Connors; Connors & Assoc. Inc.

(57) ABSTRACT

A tape measure device has an elongated blade with a central concave-convex segment with at least one planar segment adjoining edgewise the central concave-convex segment to form a junction that extends substantially along the entire length of the elongated blade. During formation of the blade the junction is annealed to avoid formation of a flaw or incipient fracture along the junction.

11 Claims, 4 Drawing Sheets

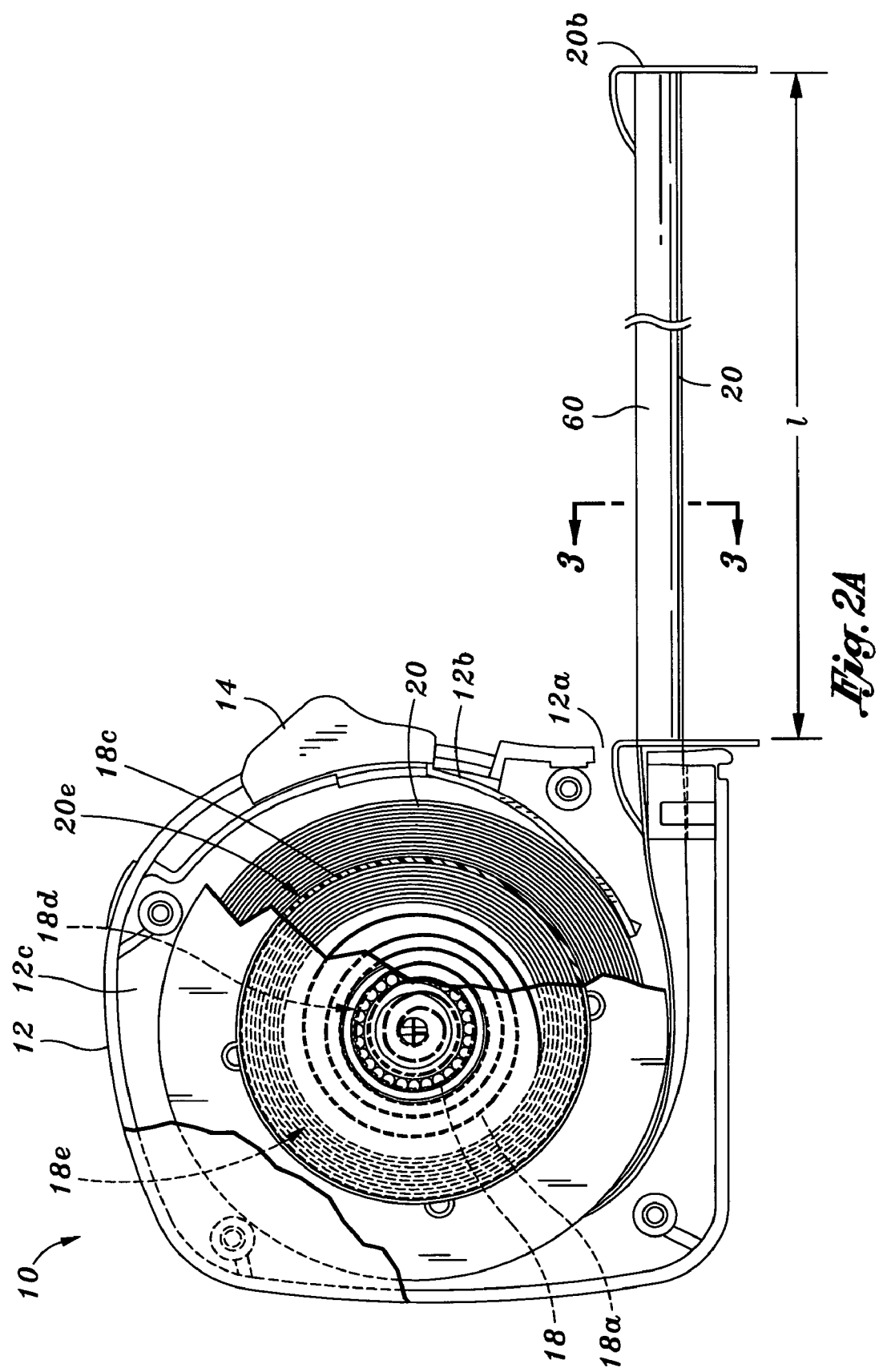

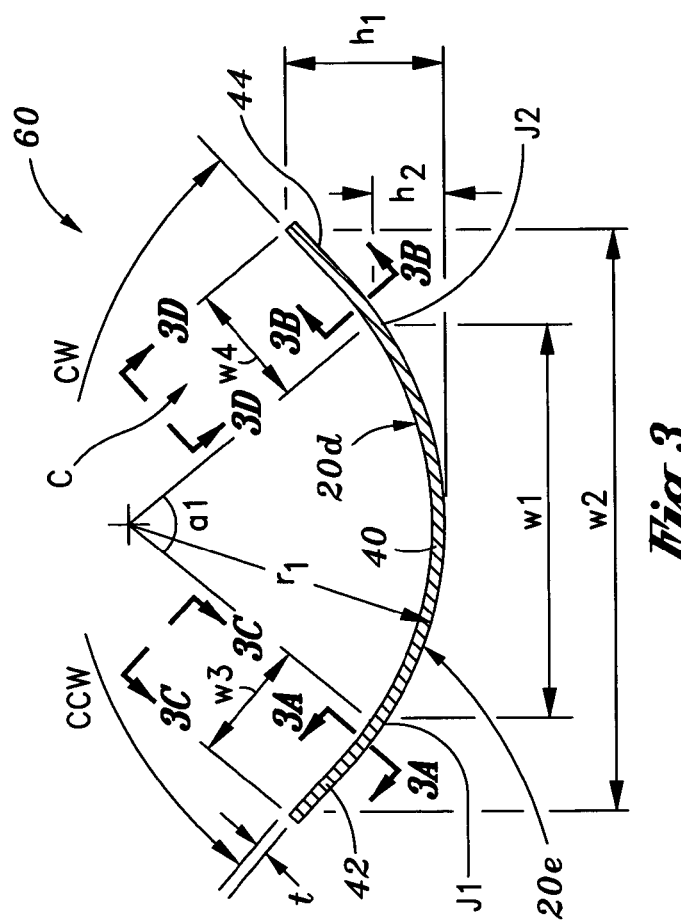
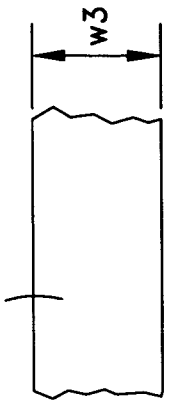
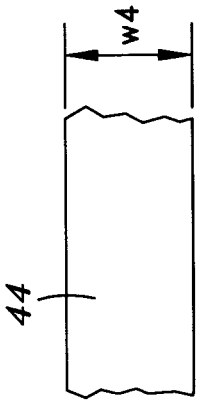
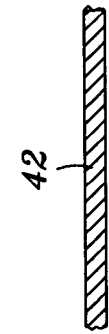
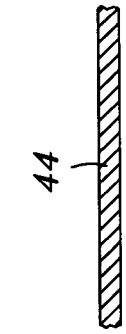

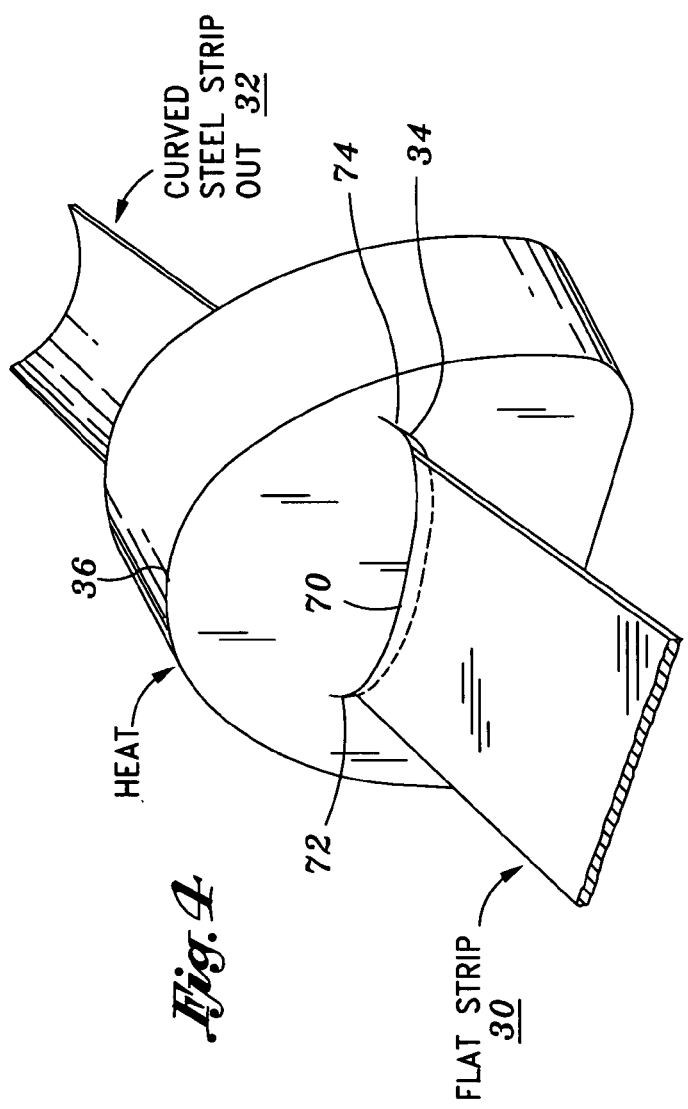
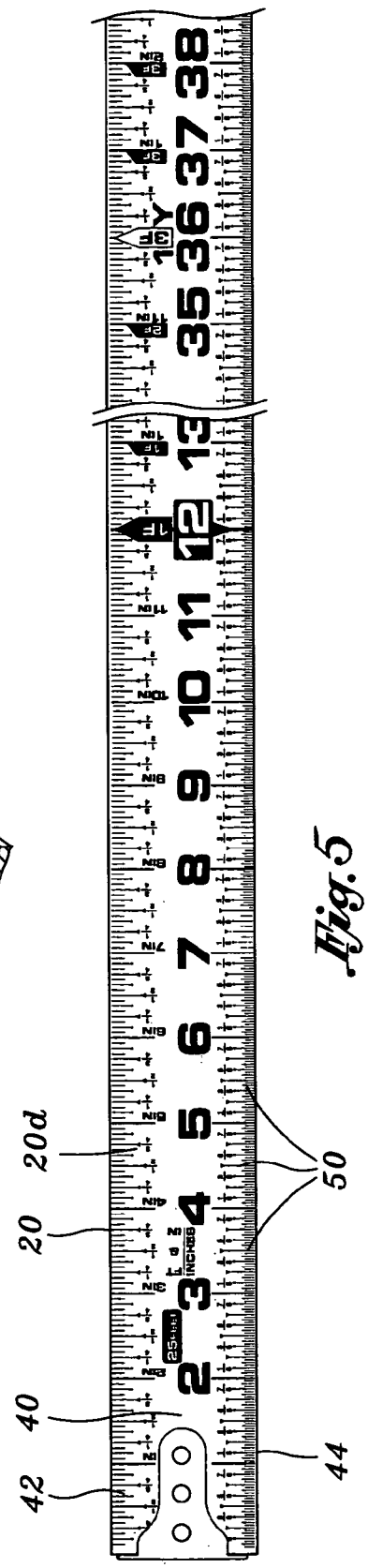

TAPE MEASURE DEVICE

INCORPORATION BY REFERENCE

The inventor incorporates herein by reference any and all U.S. patents, U.S. patent applications, and other documents cited or referred to in this application.

DEFINITIONS

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

"Rectangular shape" includes square shape.

BACKGROUND OF INVENTION

A tape measure is a device used to measure such things as length and distance. A tape measure typically comprises an elongated blade that is wound about a reel and stored within a housing. A user employs the tape measure by unwinding the elongated blade, extending the blade through an opening in the housing. The elongated blade has rule markings to measure length and distance.

Examples of tape measures are disclosed in U.S. Pat. Nos. 6,324,769; 6,367,161; and 6,662,463. As disclosed in these patents, it is desirable that an extended portion of the elongated blade be as linear as possible. For example, the extended blade portion may have a standout arcuate length of at least ten feet with a horizontal linear length greater than ninety-seven percent of the standout arcuate length. As this extended portion increases in length, its tendency to bend downward also increases due to the increase in the weight of the extended portion. This bending tendency is obviated at least to some degree by controlling the dimensions of the blade and the materials used in its construction. Additionally, the blade's cross-sectional shape is configured to resist bending. For example, the blade's cross-sectional shape may include a concave-convex central section adjoining one or more planar segments. Although this cross-sectional shape resists bending, it presents a problem; namely, along any junction line where a planar segment merges with the concave-convex central section, a flaw or incipient fracture is created using conventional stamping techniques in manufacturing the elongated blade.

SUMMARY OF INVENTION

This invention has one or more features as discussed subsequently herein. After reading the following section entitled "DETAILED DESCRIPTION OF ONE EMBODIMENT OF THIS INVENTION," one will understand how the features of this invention provide its benefits. The benefits of this invention include, but are not limited to, providing a tape measure blade having a cross-sectional configuration that resists bending but avoids during manufacture the formation of flaws or incipient fractures.

Without limiting the scope of this invention as expressed by the claims that follow, some, but not necessarily all, of its features are:

One, the tape measure device of this invention includes an elongated blade that, when in an extended position, has a predetermined cross-sectional curvature formed by a concave-convex segment and at least one planar segment adjoining edgewise the concave-convex segment. At the adjoining edges of these segments a junction is formed that extends substantially along the entire length of the elongated blade. This junction is annealed during formation of the blade to avoid creating a flaw or incipient fracture along the junction.

Two, annealing may comprise passing a substantially flat strip of metallic material lengthwise through a slit opening in a die and heating the strip. The flat strip of metallic material is heated to a temperature substantially above ambient temperature but below the melting point of the metallic material. The die or the material may be heated, or both may be heated, or the flat strip of metallic material may be heated prior to passing it through the slit opening. The metallic material may be selected from the group consisting of chromium, nickel, carbon, and iron. A strip made from these materials is flexible and resilient material. In the case of steel strip material, the strip passes through the die at a rate from about 100 to about 200 linear feet per minute and is heated to a temperature from about 500 to about 700 degrees Fahrenheit.

Three, the slit opening has a configuration substantially conforming to the predetermined cross-sectional curvature of the blade. In one embodiment, the predetermined cross-sectional curvature of the extended blade portion has predetermined dimensions and the slit opening has dimensions that are slightly less than the predetermined dimensions of the cross-sectional curvature of the extended blade portion. Upon passing such a smaller dimensioned metallic strip through the slit in the die, the ductile metallic material is worked, i. e., stretched.

Four, the flat strip of metallic material may have a minimum of thickness of at least about 0.0030 inch, for example from about 0.0045 to about 0.0060 inch, and a width from about 0.500 to about 1.625 inches. In one embodiment, the predetermined cross-sectional curvature comprises a central concave-convex segment straddled by a pair of planar segments. The central concave-convex segment may have a radius of curvature from about 0.5 to about 1.0 inch, and the planar segments each may have a width from about 0.25 to about 0.75 inch. The planar segments may be substantially equal in width.

These features are not listed in any rank order nor is this list intended to be exhaustive.

DESCRIPTION OF DRAWING

One embodiment of this invention, illustrating all its features, will now be discussed in detail. This embodiment depicts the novel and non-obvious tape measure device of this invention as shown in the accompanying drawing, which is for illustrative purposes only. This drawing includes the following Figures (Figs.), with like numerals indicating like parts:

FIG. 2A is a side view similar to that of FIG. 2 with portions broken away and the blade partially unwound and a portion thereof in an extended position.

FIG. 3 is a cross-sectional view of the elongated blade taken along line 3—3 in FIG. 2A.

FIG. 3A is a partial, cross-sectional view of the elongated blade taken along line 3A—3A in FIG. 3.

FIG. 3B is a partial, cross-sectional view of the elongated blade taken along line 3B—3B in FIG. 3.

FIG. 3C is a plan view taken along line 3C—3C in FIG. 3.

FIG. 3D is a plan view taken along line 3D—3D in FIG. 3.

FIG. 4 is a perspective view illustrating a flat strip of metal passing through a die to form the blade according to this invention.

FIG. 5 is a plan view of the blade illustrating the ruled markings on the surface of the blade used in the tape measure device shown in FIG. 1.

DETAILED DESCRIPTION OF ONE EMBODIMENT OF THIS INVENTION

Figure 2:
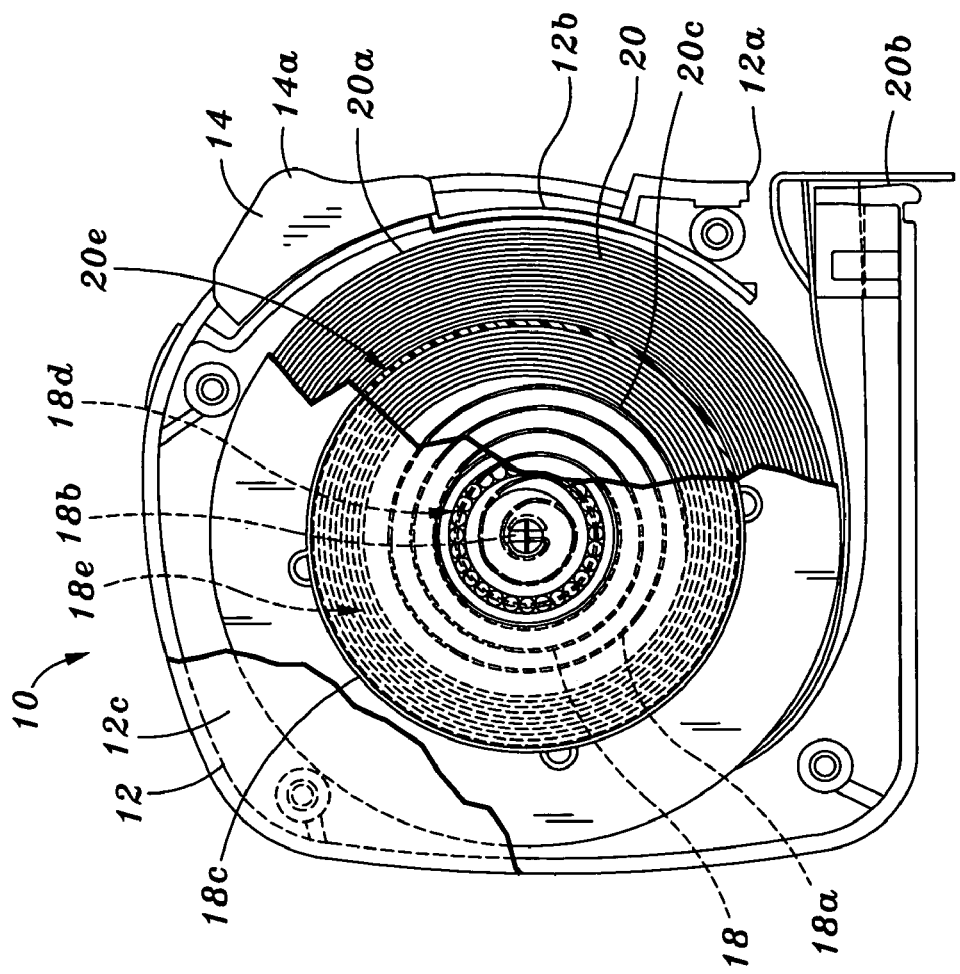
FIG. 2 is a side view of the tape measure device shown in FIG. 1 with portions broken away and the blade completely retracted.
Figure 1:
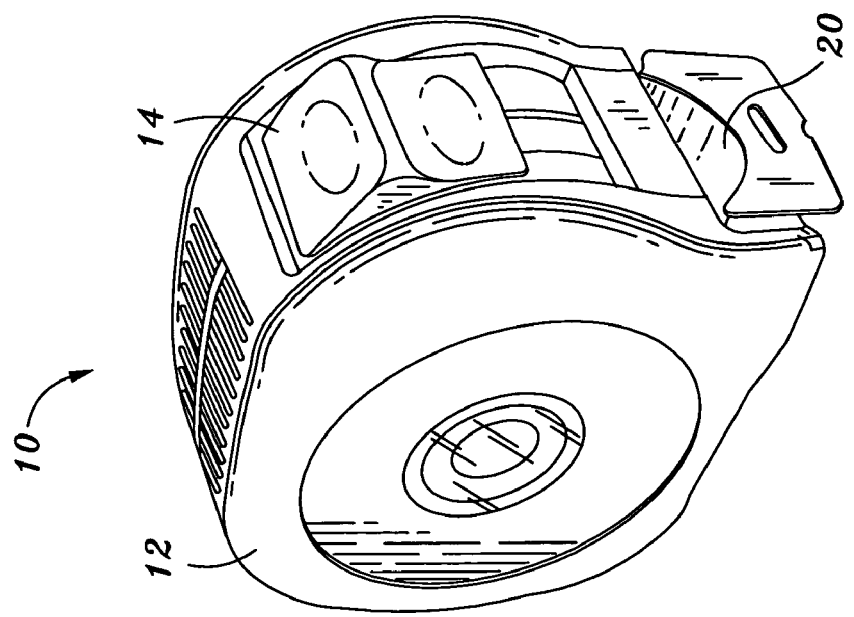
FIG. 1 is a perspective view of the tape measure device according to one embodiment of this invention.

As shown in FIGS. 1 through 3, the tape measure device 10 of the present invention includes an elongated blade 20 heat-treated and worked in accordance with this invention. This blade 20 is stored in a wound-up condition in a blade holding assembly 14 mounted to a housing 12. As shown in FIG. 5, the elongated blade 20 has on at least one surface graduated markings 50, for example ruled lines denoting inches and fractions thereof, located on a top side 20d, thus allowing a user to measure length or distance. Ruled lines denoting metric lengths or distance may also be used. The housing 12 is a box-like structure having a substantially rectangular shape when view from the side as shown in FIG. 2. Within the housing 12 is an internal chamber 12c that receives a reel 18, a component of the blade holding assembly 14. The blade 20 has an internal end 20c connected to the reel 18 and a free end 20b extending outwardly through an opening 12a in the housing 12.

As shown in FIG. 2A, the blade holding assembly 14 is of conventional design, being manually actuated to hold a selected portion 60 (FIG. 2A) of the blade 20 in an extended position and manually actuated to release the extended blade 20, rewinding the blade portion 60 about the reel 18. The blade 20 is unwound manually to extend outwardly from the opening 12a in the housing 12 any selected portion 60 of the blade 20 as determined by the user. The blade holding assembly 14 includes the reel 18 about which the blade 20 is normally completely wound about as shown in FIG. 2 and a button 14a on the exterior of the housing 12 for operating a brake 12b located within the housing 12. In one position of the button 14a as shown in FIG. 2, the brake 12b is disengaged. In another position shown in FIG. 2A, the brake 12b is engaged to hold the selected extended portion 60 in place. The blade 20 may be withdrawn from the housing 12 when the brake 12b is engaged, so the blade is held in any desired extended position. Release of the brake 12b initiates the rewinding of the extended blade portion 60.

The reel 18 is mounted within the internal chamber 12c for rotation. It includes a cylinder 18c, a coil spring 18a operatively disposed within the cylinder 18c, and a central shaft 18b connected to the housing 12 bout which the reel rotates. The coil spring 18a has one end 18d attached to the central rod 18b and its other end 18e attached to the cylinder 18c. The coiled spring 18a is tightened as the blade 20 is manually pulled from the housing 12 so that it may rewind the extended portion 60 of the blade 20 onto the reel 18 upon manipulation of the button 14a to release the brake 12b. The blade 20 is attached at its one end 20c to the cylinder 18c. As the blade 20 is pulled from the housing 12, it extends tangentially to the cylinder 18c.

The brake 12b is located within the housing 12 and with the button 14a in the position shown in FIG. 2A, the brake is engaged to push against a wound-up portion 20a of the elongated blade 20 to inhibit the reel 18 from rotating but not so strong as to prevent a user from further unwinding the blade from the reel 18. As the blade 20 is extended, the brake 12b as shown in FIG. 2A continuously presses against the wound-up portion 20a, holding the blade in any desired extended position (FIG. 2A) until the user pushes the button 14a, sliding the button upward as viewed in FIG. 2A along the exterior of the housing 12, moving the button to its disengaged position shown in FIG. 2. Pushing the button 14a upward, lifts the brake 12b from the wound-up portion 20a. Due to the action of the spring 18a, the reel rotates counter-clockwise as viewed in FIG. 2A, rewinding the blade 20 around the reel 18 to flatten the blade as it is wound about the reel. The blade holding assembly 14 thus enables the user to control the operation of the reel 18 so the blade remains in the selected extended position until the button 14a is actuated.

The extended portion 60 of the blade 20 has a curved cross-section as shown in FIG. 3. The blade 20 is substantially flat when wound about the reel 18 and its topside 20d faces the reel and its bottom side 20e faces away from the reel. The blade 20 in the wound-up and flattened condition may have a width of at least about 1 inch, for example from about 1.600 to about 1.625 inches. The blade's thickness t may be about 0.0045 inches, for example from about 0.0030 to about 0.0060 inches. The extended portion 60 of the blade 20 has a cross-sectional curvature C that is substantially uniform along the entire length 1 of the extended portion 60. This cross-sectional curvature C comprises an arcuate, concave-convex central section 40 and a pair of lateral, substantially flat planar end segments 42, 44 that straddle the concave-convex central section. The adjoining edges of the planar end segments 42, 44 and central section 40 merge at the junction line J1 and J2 extending along the length of the blade 20. The arcuate, concave-convex central section 40 may have a radius of curvature $r_1$ from about 0.5 inch to about 1.0 inch, a height $h_2$ from about 0.100 inch to about 0.250 inch, a width $w_1$ from about 0.600 inch to about 0.925 inch, and spans an angle $a_1$ from about 71.0 degrees to about 105.0 degrees. The extended, elongated blade 60 has a blade height $h_1$ from about 0.125 inch to about 0.500 inch, and a width $w_2$ from about 0.925 inch to about 1.25 inch. Each of the planar end segments 42, 44 has a width $w_3$ and $w_4$, respectively, that are equal, for example from about 0.250 inch to about 0.750 inch.

The extended portion 60 of the elongated blade 20 may have a standout arcuate length of at least ten feet with a horizontal linear length greater than ninety-seven percent of the standout arcuate length. When wound-up around the reel 18, the blade 20 is flattened. Upon moving from the selected extended position (FIG. 2A) to the wound-up position (FIG. 2), the lateral planar segment 42 moves in a counter-clockwise direction as viewed in FIG. 3, and the lateral planar segment 44 moves in a clockwise direction as viewed in FIG. 3.

In accordance with one feature of this invention, an annealing process is employed to form the blade 20. Referring to FIG. 4, the elongated blade 20 is formed from a flat strip of metallic material 30 that is heat-treated and worked according to this invention. The flat strip metallic material 30 may be selected from the group consisting of chromium, nickel carbon, and iron. The flat strip of metallic material 30 is heated and passed through a die 36 with a slit 34 having a shape and dimensions that are substantially identical to those of the cross-sectional curvature C of the blade 20. Specifically, the slit 34 has a concave-convex pattern 70 straddled by a pair of lateral planar end segments 72, 74 to produce a curved metal strip 32. The temperature is sufficient to heat the flat strip of metallic material 30 above ambient temperature but below its melting point, for example, a steel strip is heated to a temperature from about 500 to about 700 degrees Fahrenheit. The die may also be heated. Such a flat strip of the steel material 30 may pass through the slit 34 in the die 36 at a rate from about 100 to about 200 linear feet per minute. The slit 34 may have dimensions that are slightly less that the cross-sectional dimensions of the cross-sectional curvature C of the blade 20 to work the strip of metallic material 30, pulling the ductile metallic material slightly as it passing through the slit 34. The curved steel strip 32 as it emerges from the die 36 is cooled to ambient temperature to complete the annealing process.

SCOPE OF THE INVENTION

The above presents a description of the best mode contemplated of carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above which are fully equivalent. Consequently, it is not the intention to limit this invention to the particular embodiment disclosed. On the contrary, the intention is to cover all modifications and alternate constructions coming within the spirit and scope of the invention as generally expressed by the following claims, which particularly point out and distinctly claim the subject matter of the invention:

The invention claimed is:

1. A tape measure device including an elongated, annealed steel blade having when in a extended position a predetermined cross-sectional curvature formed by a concave-convex segment and at least one planar segment adjoining edgewise the concave-convex segment to form a junction that extends substantially along the entire length of the elongated blade, said junction being essentially free of any flaw or incipient fracture along the junction as a result of annealing the blade.

2. A tape measuring device comprising an annealed, metallic blade stored in a substantially wound up, substantially flatten condition and mounted to enable the blade to be unwound to extend a portion of the blade through an opening in the housing, and upon being unwound, said extended blade portion having a predetermined cross-sectional curvature comprising a central concave-convex segment with planar segments straddling the central concave-convex segment, each planar segment being integral with the central concave-convex segment along a junction that extends substantially along the entire length of the elongated blade, said junction as a result of annealing the blade being essentially free of any flaw or incipient fracture, said predetermined cross-sectional curvature being substantially uniform along the entire length of the extended blade portion.

3. The tape measuring device of claim 2 where the flatten width of the blade is at least 1 inch, the radius of curvature of the central concave-convex segment is substantially from 0.5 inch to 1.0 inch, and the planar segments each have a width substantially from 0.250 to 0.750 inch.

4. The tape measuring device of claim 3 where the planar segments are substantially equal in width.

5. The tape measuring device of claim 2 where the blade has a standout arcuate length measured along the blade of at least 10 feet with a horizontal linear length greater than 97 percent of the standout arcuate length.

6. The tape measuring device of claim 2 where the annealed, metallic blade is made from a material selected from the group consisting of chromium, nickel carbon, and iron.

7. The tape measuring device of claim 2 where the thickness of the annealed, metallic blade is substantially at least 0.0030 inch.

8. The tape measuring device of claim 7 where the thickness of the annealed, metallic blade is substantially from 0.0045 to 0.0060 inch.

9. A tape measuring device comprising an annealed, steel blade stored in a substantially wound up, substantially flatten condition and mounted to enable the blade to be unwound to extend a portion of the blade through an opening in the housing, and upon being unwound, said extended blade portion having a predetermined cross-sectional curvature comprising a central concave-convex segment with planar segments straddling the central concave-convex segment, each planar segment being substantially equal in width and integral with the central concave-convex segment along a junction that extends substantially along the entire length of the elongated blade, said junction as a result of annealing the blade being essentially free of any flaw or incipient fracture, said predetermined cross-sectional curvature being substantially uniform along the entire length of the extended blade portion, said flatten blade having a width of substantially at least 1 inch and a thickness substantially from 0.0030 to 0.0060 inch, said blade having a standout arcuate length measured along the blade of at least 10 feet with a horizontal linear length greater than 97 percent of the standout arcuate length.

10. The tape measuring device of claim 9 where the concave-convex central segment has a radius of curvature substantially from 0.5 inch to 1.0 inch, a height substantially from 0.100 inch to 0.250 inch, a width substantially from 0.600 inch to 0.925 inch, and an angle substantially from 71.0 degrees to 105.0 degrees is formed between a center of the radius of curvature and the junctions.

11. The tape measuring device of claim 10 where the extended, elongated blade has a blade height substantially from 0.125 inch to 0.500 inch, and a width substantially from 0.925 inch to 1.25 inch.

* * * * *